United States Patent Office 3,178,379
Patented Apr. 13, 1965

3,178,379
METHOD FOR PREPARING CYANOACRYLATE MONOMER ADHESIVE COMPOSITIONS
Thomas H. Wicker, Jr., and Newton H. Shearer, Jr., Kingsport, Tenn., assignors to Eastman Kodak Company, Rochester, N.Y., a corporation of New Jersey
No Drawing. Filed June 14, 1961, Ser. No. 116,950
6 Claims. (Cl. 260—17)

This invention relates to an improved method for the preparation of adhesive formulations. More particularly, it relates to the preparation of adhesive compositions containing esters of α-cyanoacrylic acid.

Several patents of ourselves and our co-workers have disclosed adhesive compositions containing monomeric α-cyanoacrylates. These esters have been discovered to be outstanding high-strength adhesives for bonding all kinds of materials, such as glass, metals, plastics, rubber, wood, cement, paper, cloth, etc., to themselves or to each other. The mechanism by which these cyanoacrylates function as adhesives is not completely understood; but it is thought that the adhesive properties are attributable to the rapidity with which thin films of the monomeric α-cyanoacrylates polymerize in the absence of heat, light or polymerization catalyst. When two surfaces are placed together with a thin film of a monomeric α-cyanoacrylate between them, the monomer rapidly polymerizes and forms a highly tenacious bond.

The patent to Coover and Shearer, U.S. 2,794,788, discloses that in using an α-cyanoacrylate adhesive for bonding porous materials the low viscosity of the α-cyanoacrylate monomer may result in excessive penetration of the porous material and that the viscosity of the adhesive can be increased to an optimum level by dissolving minor proportions of polymeric alkylcyanoacrylates in the monomer. Such compositions have been formed simply by mixing the monomeric cyanoacrylate with the desired polymeric viscosity regulator and with other ingredients normally used in such adhesives, such as a polymerization inhibitor, and thereafter agitating the mixture to achieve solution. While such compositions have rendered good results we have now discovered that the properties of the adhesive composition can be markedly improved by following a novel method of incorporating the polymeric viscosity modifier with the cyanoacrylate monomer.

In accordance with the present invention the polymeric viscosity modifier for the cyanoacrylate adhesive is first dissolved in a volatile organic solvent which is compatible with the cyanoacrylate monomer. The solution of the polymer is then blended with the monomer. Thereafter the volatile organic solvent is stripped from the mixture under vacuum. The adhesive composition prepared in this manner has unexpected advantages over compositions containing the same principal ingredients but prepared by the previous method without the use of a volatile solvent. Advantages of the new method are that the product unexpectedly has superior clarity, superior bulk stability and superior activity in the rapid formation of a strong adhesive bond. Still another advantage is obtained when preparing an adhesive formulation from a cyanoacrylate monomer which, for storage purposes, has a high content of a volatile polymerization inhibitor such as sulfur dioxide. The vacuum-stripping step of our new method aids in removing the volatile inhibitor from the monomer and reducing its concentration to a desired lower level.

The method of the invention can be practiced with any of the cyanoacrylate adhesives. The cyanoacrylates having adhesive properties are compounds of the general formula:

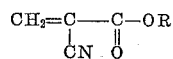

wherein R is an alkyl, alkenyl, cyclohexyl or phenyl radical of from about 1 to 16 carbon atoms. Esters in which R is an alkyl group, preferably a methyl, ethyl, n-propyl, iso-propyl, or amyl group, are particularly effective as adhesives.

A number of polymers are useful as viscosity regulators or modifiers for the cyanoacrylates to provide viscous adhesive formulations. In general they are stable polymeric substances that form with the cyanoacrylate either a true or a colloidal solution of substantially higher viscosity than the cyanoacrylate monomer and that do not adversely affect the adhesive characteristics of the cyanoacrylate when formulated therewith in minor amounts. Suitable polymers include, for example, polymeric alkylcyanoacrylates, polyacrylates, poly(alkylacrylates), cellulose nitrate, cellulose acetate, cellulose propionate, cellulose butyrate, and other similar cellulose organic acid esters or other polymeric materials which are soluble in the polymer.

In the method of the invention the polymer is dissolved in a selected volatile organic solvent for blending with the α-cyanoacrylate. The solvent must be a substance that will not cause polymerization of the cyanoacrylate monomer. It must also be sufficiently volatile to be readily distillable from the adhesive composition. Preferably the solvent should have a boiling point no higher than about 80° C. at atmospheric pressure. Examples of suitable solvents include chloroform, dichloromethane, benzene, acetone, ethyl bromide, ethylene dichloride, ethyl acetate, methyl propionate, etc.

The concentration of polymer in the volatile solvent can be within a considerable range. In general, it is preferred to form a solution containing from about 5 to 30 weight percent of the polymer, but somewhat higher or lower concentrations can be used.

The amount of polymer solution to be used relative to the monomer will be an amount sufficient to form a final adhesive composition containing the desired concentration of the polymeric thickener or viscosity regulator. The polymer is normally a minor component of the final composition. In general, up to about 25 weight percent of polymer based on the final adhesive composition can be employed to regulate the viscosity of the cyanoacrylate monomer without adversely affecting the adhesive characteristics of the composition. Concentrations of about 1 to 5 weight percent polymer generally are preferred.

The blending operation is preferably carried out by stirring the polymer solution with the cyanoacrylate monomer at normal temperature and pressure. However, it may be desired to warm the mixture to achieve good solubility or to increase pressure to prevent premature vaporization of the volatile solvent. In any event, the combination of temperature and pressure during the blending step must be such that the solvent, the polymer, and the α-cyanoacrylate monomer remain in the liquid phase and in solution.

Following the blending step, the pressure is reduced on the solution to a level below about 10 mm. Hg to achieve vaporization of the volatile solvent. Advantageously, a dry inert gas such as nitrogen is bubbled through the liquid to aid in the vacuum stripping of the solvent. The solution can also be warmed to facilitate vaporization of the solvent. Thus, in general, the conditions of pressure and temperature during the vacuum-stripping stage are such that the solvent substantially entirely vaporizes and distils from the liquid mixture while the polymer and cyanoacrylate monomer remain substantially entirely in the liquid phase and in solution.

Although our invention provides an improved method of incorporating a polymeric viscosity modifier in the cyanoacrylate monomer, it should be understood that the method is applicable to preparation of cyanoacrylate adhesive compositions containing additional ingredients. Such other ingredients can include, for example, plasticizer esters in amounts of 1 to 20 weight percent, as disclosed in U.S. 2,784,127, polymerization inhibitors such as sulfur dioxide and hydroquinone in amounts of 0.001 to 0.05 weight percent, as disclosed in U.S. 2,765,332, etc. As already mentioned our method aids in reducing the content of volatile stabilizer in the monomer that might be excessive for the intended uses of the adhesive compositions.

The ultimate adhesive composition based on a cyanoacrylate monomer must be essentially free of water to avoid polymerization of the monomer in storage. The use of a solvent for incorporating the polymer in the adhesive composition in accordance with the invention offers the advantage that one can start with a polymer or a solvent that contains water and dry the polymer solution azeotropically before mixing the solution with the dry cyanoacrylate monomer. The azeotropic drying is accomplished by refluxing the polymer solution in distillation apparatus provided with a water separator in the reflux line. This eliminates the need for separate drying of the polymer and the solvent.

The following examples offer a comparison of one embodiment of the method of the invention with another method for preparing cyanoacrylate adhesive compositions:

Example 1

A 500-ml., three-neck flask was equipped with a magnetic stirrer, a nitrogen capillary tube for the introduction of nitrogen below the surface of the liquid, and an outlet to a vacuum system. Into the flask was charged 45.5 parts methyl 2-cyanoacrylate containing 100 p.p.m. sulfur dioxide, 1.5 parts dimethyl sebacate, and 20 parts of a 15% solution of a polymethyl methacrylate in dichloromethane. Vacuum was applied to the system, slowly at first, and the dichloromethane and excess sulfur dioxide were removed at a final pressure of 5–6.5 mm. After one hour, a product was obtained which was haze-free, stable and active.

Example 2

Example 1 was repeated with the exception that chloroform was used as the solvent for the polymer. The finished adhesive product was free of haze or insoluble matter, gave 10 second, glass-glass bonds and was stable for a period of time in excess of one year.

Example 3

Example 1 was repeated with the exception that benzene was used as a solvent for the polymer. The resulting adhesive product was haze-free, active and stable.

The following example illustrates the preparation of a viscous adhesive formulation without the aid of a volatile solvent.

Example 4

In a clean, dry bottle as placed 45.5 parts of methyl 2-cyanoacrylate containing 100 p.p.m. sulfur dioxide, 1.5 parts dimethyl sebacate and 3.0 parts of polymethyl methacrylate. The bottle was placed on a set of rolls and the mixture was rotated for three hours. At the end of this time, solution was complete and the mixture was transferred to a flask equipped as described above. Vacuum was applied to the flask and the excess sulfur dioxide was removed at a final pressure of less than 1 mm. for one hour. At the end of the one-hour period, the material would not give a glass-glass bond within 30 seconds. After an additional pumping period of 45 minutes, a sample was obtained which gave a ten second, glass-glass bond (the sample was not stable and polymerized on standing for a period of one week).

The following example illustrates the drying of poly(methyl 2-cyanoacrylate) prior to the mixing with monomer and removal of solvent.

Example 5

A solution of 3.0 g. of poly(methyl 2-methacrylate) was prepared in 100 grams of dichloromethane and placed in a flask fitted with reflux condenser and water separating tube. The mixture was refluxed until no additional water was removed and was then used to prepare a stable, active, viscous adhesive formulation as described in Example 1.

From the above examples it can be seen that our new method of incorporating a polymeric viscosity regulator in an adhesive composition of the cyanoacrylate type provides unexpected advantages in the properties of the resulting product. Thus the product of Example 1 was haze-free, stable and active. On the other hand, the product of Example 4, after a 1-hour vacuum distillation to remove excess sulfur dioxide, still had low activity. An additional vacuum distillation period of 45 minutes was required to form an adhesive of satisfactory activity. However, this adhesive was not so stable as one formed by the new method and polymerized on standing for one week.

The invention has been described in considerable detail with particular reference to certain preferred embodiments thereof, but it will be understood that variations and modifications can be effected within the spirit and scope of the invention as described hereinabove, and as defined in the appended claims.

We claim:

1. In the formulation of an essentially water-free adhesive composition based on an α-cyanoacrylate monomer of the formula

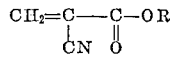

wherein R is a radical of about 1 to 16 carbon atoms from the group consisting of alkyl, alkenyl, cyclohexyl and phenyl, and containing a minor amount of a viscosity regulating polymer, the improvement which comprises forming a solution of said polymer in a volatile organic solvent, blending the solution with the cyanoacrylate monomer under conditions of temperature and pressure at which the solvent, the polymer and the cyanoacrylate monomer are in the liquid phase, subjecting the resulting mixture to distillation conditions of temperature and pressure adapted to vaporize the volatile solvent but not the polymer and the cyanoacrylate, removing the vaporized solvent from the mixture and recovering an adhesive composition comprising said α-cyanoacrylate and a minor amount of said polymer.

2. In the formulation of an essentially water-free adhesive composition based on an alkyl α-cyanoacrylate monomer of the formula

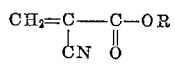

wherein R is an alkyl radical of about 1 to 16 carbon atoms, and containing a minor amount of a viscosity regulating polymer, the improvement which comprises forming a solution of a volatile organic solvent having a boiling point at atmospheric pressure no higher than 80° C. and a polymer that forms a mixture with the cyanoacrylate monomer of higher viscosity than said monomer, the concentration of polymer in said solution with said organic solvent being in the range of 5 to 30 weight percent, blending the solution with the alkyl α-cyanoacrylate monomer in proportions adapted to form an ultimate adhesive composition containing about 1 to 25 weight percent polymer based on the cyanoacrylate monomer, said blending being carried out under conditions of temperature and pressure at which the polymer, the solvent and the cyanoacrylate monomer are in the liquid phase, thereafter, in a vacuum-stripping stage, subjecting the resulting mixture to conditions of temperature and pressure, including a pressure below 10 mm. Hg, at which substantially all of said solvent vaporizes from the mixture and substantially all of said polymer and cyanoacrylate monomer remain in the liquid phase.

3. The method according to claim 2 in which an inert gas is passed through the liquid mixture during the vacuum-stripping stage.

4. The method according to claim 2 in which said cyanoacrylate monomer prior to blending with the polymer solution contains an amount of volatile polymerization inhibitor in a concentration excessively high for the ultimate adhesive composition and in which the concentration of said volatile polymerization inhibitor is reduced to a desired level during the vacuum-stripping stage.

5. The method according to claim 2 in which said polymer initially contains water and in which said water is substantially entirely removed from the polymer before the latter is incorporated with the cyanoacrylate monomer by azeotropic distillation of the solution of polymer and organic solvent prior to blending of the solution with the cyanoacrylate monomer.

6. In the formulation of an essentially water-free adhesive composition based on methyl α-cyanoacrylate and containing a minor amount of a viscosity regulating polymer, the improvement which comprises forming a solution of a polymer selected from the group consisting of polymeric alkyl cyanoacrylates, poly(alkylacrylates), cellulose nitrate and cellulose organic acid esters and a volatile organic solvent selected from the group consisting of chloroform, dichloromethane, benzene, acetone, ethyl bromide, ethylene dichloride, ethyl acetate and methyl propionate, the concentration of polymer in said solution being in the range of 5 to 30 weight percent, blending the solution with the methyl α-cyanoacrylate monomer in proportions adapted to form an ultimate adhesive composition containing about 1 to 5 percent polymer based on the cyanoacrylate monomer, said blending being carried out under conditions of temperature and pressure at which the polymer, the solvent and the cyanoacrylate monomer are in the liquid phase, thereafter, in a vacuum-stripping stage, maintaining the resulting mixture at a pressure below about 6.5 mm. Hg and at about room temperature while passing an inert stripping gas through the mixture, whereby to vaporize substantially all of said solvent from the mixture, and recovering a methyl α-cyanoacrylate adhesive composition containing said polymer.

References Cited by the Examiner

UNITED STATES PATENTS

| | | | |
|---|---|---|---|
| 2,613,156 | 10/52 | McGaffin et al. | 260—34.2 |
| 2,765,332 | 10/56 | Coover et al. | 260—17 |
| 2,794,788 | 6/57 | Coover et al. | 260—17 |

JOSEPH L. SCHOFER, *Primary Examiner.*

LEON J. BERCOVITZ, *Examiner.*